Feb. 6, 1962 J. L. HUBBARD 3,019,625

PATTERN MECHANISM FOR PILE FABRICS

Filed Oct. 6, 1958 12 Sheets-Sheet 1

Feb. 6, 1962 J. L. HUBBARD 3,019,625

PATTERN MECHANISM FOR PILE FABRICS

Filed Oct. 6, 1958 12 Sheets-Sheet 2

Feb. 6, 1962 J. L. HUBBARD 3,019,625

PATTERN MECHANISM FOR PILE FABRICS

Filed Oct. 6, 1958 12 Sheets-Sheet 3

Feb. 6, 1962 J. L. HUBBARD 3,019,625

PATTERN MECHANISM FOR PILE FABRICS

Filed Oct. 6, 1958 12 Sheets-Sheet 4

Feb. 6, 1962 J. L. HUBBARD 3,019,625

PATTERN MECHANISM FOR PILE FABRICS

Filed Oct. 6, 1958 12 Sheets-Sheet 5

Feb. 6, 1962 J. L. HUBBARD 3,019,625

PATTERN MECHANISM FOR PILE FABRICS

Filed Oct. 6, 1958 12 Sheets-Sheet 6

Feb. 6, 1962 J. L. HUBBARD 3,019,625

PATTERN MECHANISM FOR PILE FABRICS

Filed Oct. 6, 1958 12 Sheets-Sheet 8

Feb. 6, 1962 J. L. HUBBARD 3,019,625

PATTERN MECHANISM FOR PILE FABRICS

Filed Oct. 6, 1958 12 Sheets-Sheet 9

Feb. 6, 1962 J. L. HUBBARD 3,019,625

PATTERN MECHANISM FOR PILE FABRICS

Filed Oct. 6, 1958 12 Sheets-Sheet 10

Feb. 6, 1962 J. L. HUBBARD 3,019,625

PATTERN MECHANISM FOR PILE FABRICS

Filed Oct. 6, 1958 12 Sheets-Sheet 11

Feb. 6, 1962 J. L. HUBBARD 3,019,625

PATTERN MECHANISM FOR PILE FABRICS

Filed Oct. 6, 1958 12 Sheets-Sheet 12

3,019,625
Patented Feb. 6, 1962

3,019,625

PATTERN MECHANISM FOR PILE FABRICS

John L. Hubbard, Cornwall on the Hudson, N.Y., assignor to The Firth Carpet Company, New York, N.Y., a corporation of New York Filed Oct. 6, 1958, Ser. No. 765,503
6 Claims. (Cl. 66—84)

This invention relates to a device which controls the length of the loops which are superimposed on a base fabric individually. Particularly, this device is an attachment for pile fabric making machines wherein each separate pile loop is formed by an individual hook. This invention is an improvement over the different types of pattern mechanisms which have been used on knitting machines, looms, turfting machines and other pile fabric making units. Primarily, this invention is directed to a pattern mechanism used on a knitting machine of the so-called warp or flat bed type but it is not limited thereto.

Various types of pattern mechanisms for pile fabrics have been developed for knitting machines. This pattern mechanism is especially adaptable to knitting machines where the needles work horizontally, such as are described in U.S. Patent 2,130,236 or 2,236,994. While the machines described in these patents are not designed for pile fabrics, the pattern mechanism of this invention may be attached to such a machine in order to transform it into a knitting machine for manufacturing pile fabrics. One known method by which pile fabrics are made on a knitting machine is to use stationary wires over which pile yarn is fed, back and forth, and is then bound into the chain stitches as outlined, for example, in U.S. Patent 2,802,355.

The primary object of this invention is to provide a pattern mechanism which may be applied to knitting machines which employ hooks to form the pile loops. When attached to a knitting machine, no additional drive means are necessary to operate this pattern mechanism and no machinery such as a Jacquard has to be provided on the machine in order to obtain the relief design required.

Another important object of this invention is the provision of a pattern attachment in a flat bed knitting machine using as little as two bars, one to serve for the backing yarn and the other to serve for the pile yarn and a guide unit to guide the warp yarn. The bar having the pile yarn works in combination with the pattern attachment of this invention so that the pile yarn is formed into loops of different heights in the same course or in separate courses, according to a predetermined design which is set up in the pattern attachment.

A further object of this invention is to provide a pattern attachment wherein a drum or chain length controls each individual hook for each individual course in such a manner that the pile height is formed in such a way as to produce a relief type design without using more than one frame of pile yarn, thus employing only one thread of pile yarn for each lengthwise pile row in spite of the fact that the loops of the successive courses formed by the same thread may be of various heights in various courses.

This invention is a combination of many factors which are combined to form a pattern attachment particularly useful in apparatus used for making pile fabrics. This pattern attachment controls the hooks on a fabric machine to not only perform the function of making loops superimposed on a base fabric but also to make these loops of different lengths in a predetermined design without basically affecting the construction of the apparatus to which the pattern mechanism is attached. Many different fabrics may be produced by using this pattern mechanism. This invention is primarily directed to apparatus for producing pile fabrics of the floor covering and upholstery type but is not limited thereto.

For complete comprehension of this invention and of the objects and advantages thereof reference is directed to the following description and accompany drawings showing by way of example the adaptation of the pattern mechanism of this invention to a conventional knitting machine.

Figure 1:
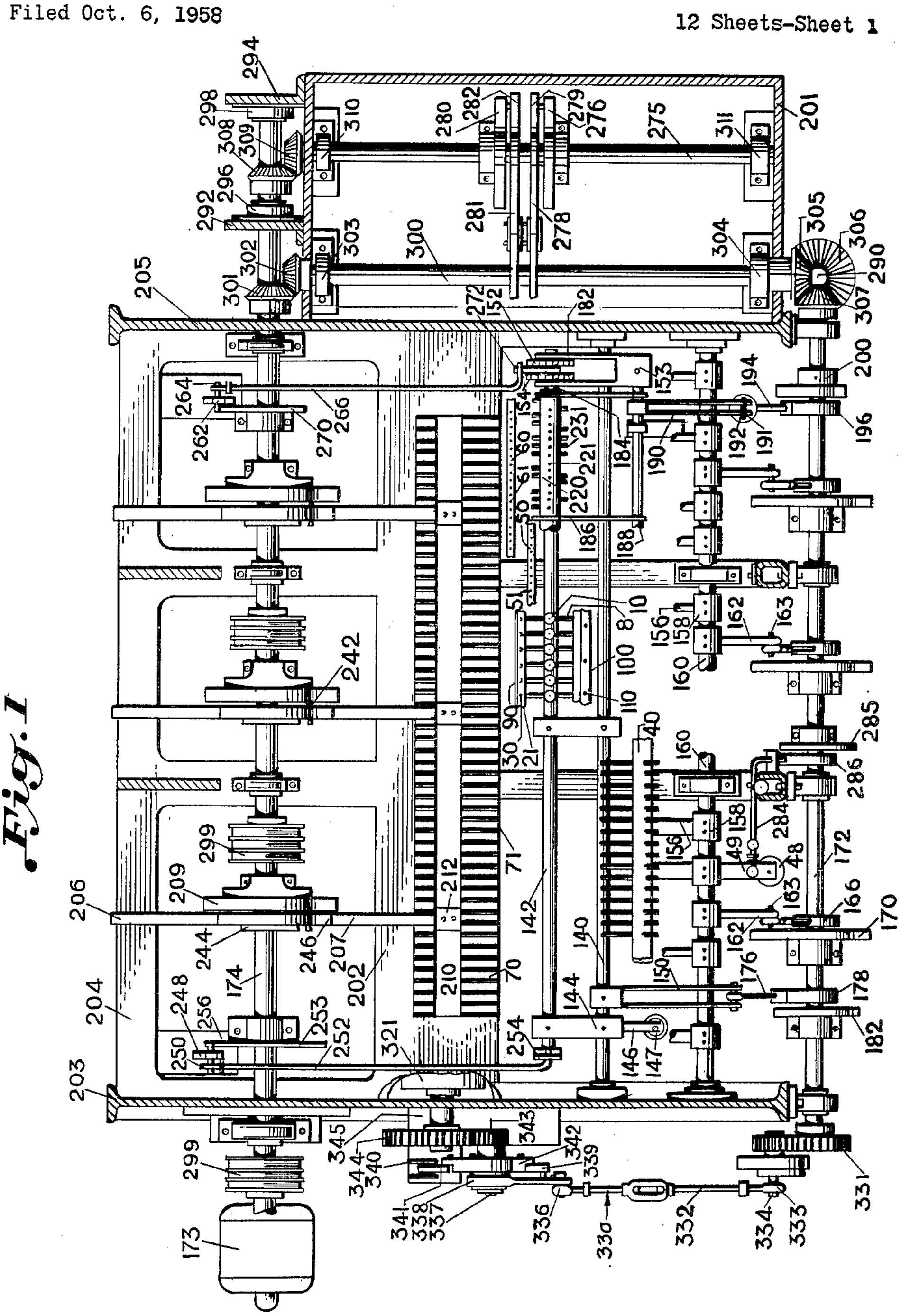
FIGURE 1 is a top plan view partially in section of a knitting machine employing this invention.

For simplification of the understanding of the invention, particularly in connection with a flat bed knitting machine, reference is made to FIGURE 1 wherein all the necessary parts of such a machine are shown.

The framework of this machine includes a horizontal frame 204 with a vertical right end frame member 205 and a vertical left end frame member 203 at the ends thereof. A rectangular vertical support frame assembly 201 is secured to and extends from right end frame member 205. The machine is driven by motor 173 which rotates rear cam shaft 174 through a belt (not shown) and pulley 299.

The needle bed 70 is of the horizontal type and may include as many needle guides 71 per inch as the wales per inch are required in the fabric which is to be made. The needles 81 (see FIGURES 13–19) are reciprocated in needle guides 71 by linkages actuated by needle cams 209 mounted on the rear cam shaft 174. These needle cams 209 are preferably enclosed type cams in order to accurately control the reciprocation stroke of the needles 81.

The above linkages comprise a return pull 210 mounted across the needle bed 70 and secured thereto by means of connecting plates 212 each of which has an extension fastened to needle driver blocks 207 from which extends needle driver arm 206. Connecting pin 208 secures slide bar 246 to needle driver arm 206. The slide bar 246 is in turn reciprocably supported by needle bearing block 244 mounted on shaft 174. Needle cam follower 242 is secured to and extends from the slide bar 246 into engagement with the cam surface in cam 209.

Shaft 174 extends beyond right end frame member 205 and carries a bevel gear 301 which engages bevel gear 302 secured to one end of shaft 300 mounted in frame assembly 201. Bevel gear 305 mounted on the other end of shaft 300 engages bevel gear 307 secured to one end of front cam shaft 172. Thus rotative power is transmitted from rear cam shaft 174 through gears 301 and 302 to shaft 300, and through gears 305 and 307 to front cam shaft 172.

The portion of rear cam shaft 174 which extends beyond right end frame member 205 also carries bevel gear 308 which engages bevel gear 309 mounted on one end of cam shaft 275 supported by frame assembly 201. Backing yarn cam 280 is mounted on cam shaft 275 and through combination cam slide and connecting rod 281 and cam follower 282 acts to reciprocate backing yarn guide bar 60. Pile yarn cam 276 is also mounted on cam shaft 275 and through cam follower 279 and combination cam slide and connecting rod 278 acts to reciprocate pile yarn guide bar 50.

Figure 2:
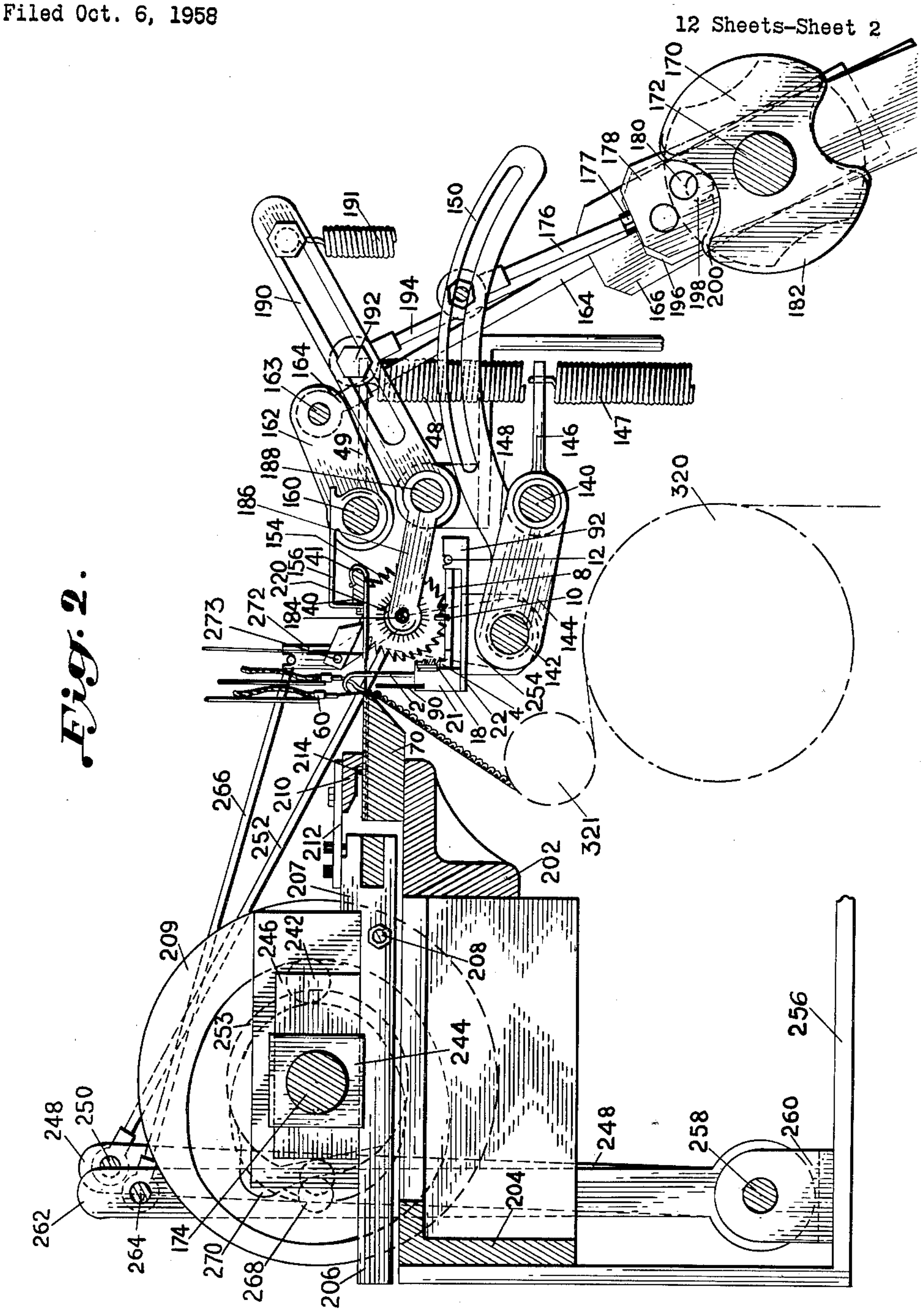
FIGURE 2 is a modified side view of the knitting machine of FIGURE 1.
Figure 3:
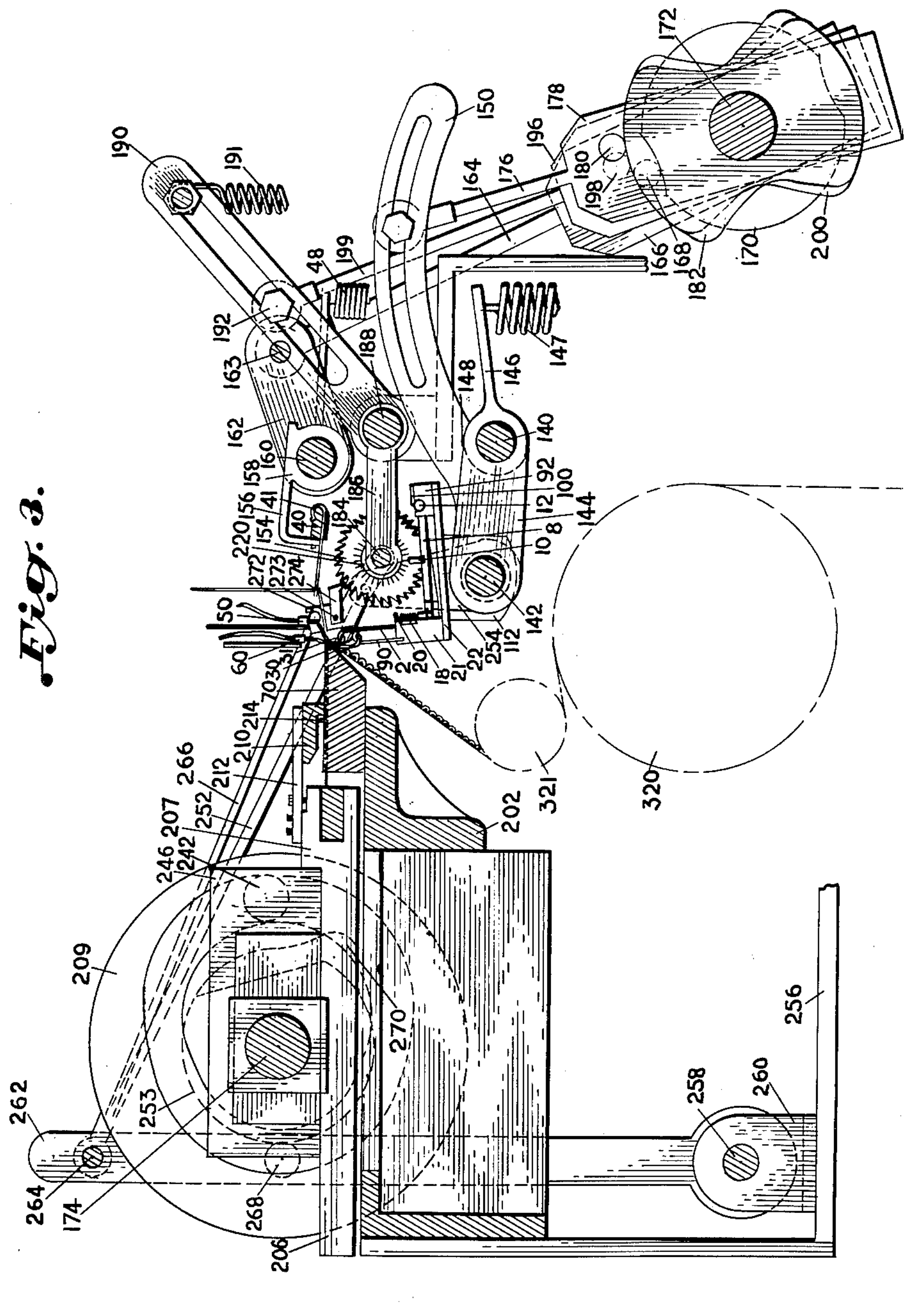
FIGURE 3 is a modified side view similar to FIGURE 2, except that the apparatus is shown in its next step.

Referring to FIGURES 2 and 3, warp yarn guide bar 40 with its warp yarn guides 41 is connected to warp yarn guide shaft 160 by means of warp yarn collar 158 secured to the shaft 160. A warp yarn guide bar bracket 156 extends from the collar 158 and is secured to said warp yarn guide bar 40. Warp yarn guide shaft 160 is oscillated about its own axis to impart an oscillatory movement to the warp yarn guide bar 40. This movement of shaft 160 is produced by warp lifting cam 170 through cam follower 168, cam slide 166, and connecting rod 164 which is pivotally connected to warp lifting lever 162 by means of pin 163. Lever 162 is secured to the shaft 160 to transfer the motion from rotating cam 170 through the cam linkage to said shaft thereby oscillating the warp yarn guide bar 40 about shaft 160 to produce an up and down motion which is necessary for the warp yarn to be fed over needles 81.

Also attached to front cam shaft 172 immediately outside of left end frame 203 is a gear 331 providing power for the fabric take-up unit 330.

The take-up roller 320 is positioned underneath the needle bed 70 and the needle bed support 202, the latter of which forms part of the framework of the loom. The take-up roller 320 has above it a roller 321 around which the fabric is fed in order to keep it at an even tension. The take-up roller 320 preferably has a surface which is roughened in order to prevent the fabric from slipping.

The hook mounting assembly 21*a* is carried on rear hook shaft 142 for oscillation about front hook shaft 140. This is accomplished by rotating cam 182, thereby actuating cam follower 180 secured to cam slide 178 which is in turn fixed to connecting rod 176 adjustably connected to cam lever 150 which is welded to rear hook bar 144. Said rear hook bar has one end fixed on shaft 140 with the other end rotatably carried on shaft 142. A return lever 146 extends from rear hook bar 144 and has a spring 147 secured thereto in order to return the hook mounting assembly 21*a* to its at rest position.

The pattern drum 220 is mounted on drum shaft 184 for oscillation about pivoting drum shaft 188. This is accomplished by rotating cam 200 to thereby actuate cam follower 198 carried by cam slide 196 connected to connecting rod 194 which in turn is adjustably fastened to cam lever 190 secured to shaft 188. Pattern drum lever 186 at one end is secured to shaft 188 and at the other to drum shaft 184. A return spring 191 is secured to the outer end of cam lever 190 to effect return of the pattern drum to its upper position.

In addition to the up and down movement of hook mounting assembly 21*a* and perforated pattern drum 220 a motion to bring the hooks towards the pile yarn prior to its down motion and to move the ratchet 152 for pattern drum 220 in each course is also essential. Motion to advance the pattern drum course by course is obtained from cam 270 which is mounted on the rear cam shaft 174. This ratchet cam 270 is engaged by cam follower 268 carried on ratchet cam lever 262. This lever is pivotally mounted at point 258 on lever stand bracket 260 which is mounted on support bracket 256 forming a part of the frame. End 264 of rod 266 is pivotally secured to lever 262 and the other end carries ratchet pawl lever 272. The back and forth motion of the ratchet cam lever 262, therefore, rotates ratchet 152 forwardly course by course thereby turning the pattern drum 220 one row at a time in order to make the required pattern.

Cam 253, which is mounted on the rear cam shaft 174, provides the means for moving the hooks rearward and forwardly. Rear hooking cam lever 248 is pivotally mounted at 258 and carries a follower engaging cam 253. Rod end 250 of connecting rod 252 is pivotally connected to the free end of lever 248. The other end of rod 252 is secured to one end of bracket 254 while the other bracket end is carried on shaft 140.

The needles 81 reciprocate horizontally in guides 71 in guide bar 70. This action is obtained through needle cams 209 and associated linkages as previously set forth.

The previous description covers a conventional horizontal flat bed knitting machine to which the device of this invention is attached by way of example to illustrate a specific application thereof.

Figure 6:
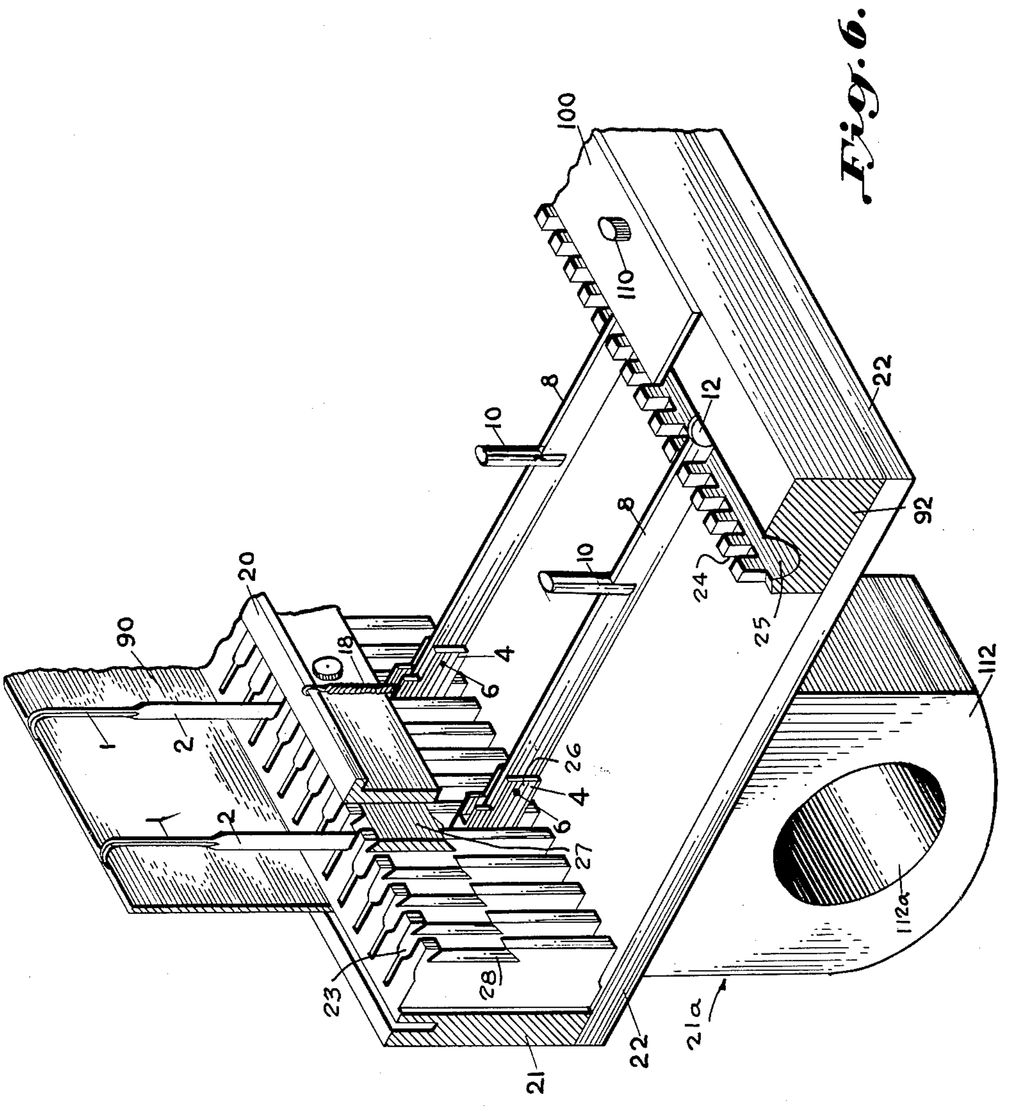
FIGURE 6 is an isometric drawing of the hook mouning assembly.
Figure 9:
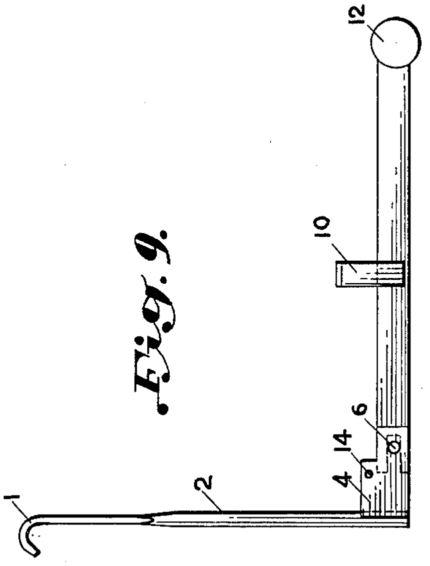
FIGURE 9 is a side view of the combined hook and hook actuating lever.
Figure 8:
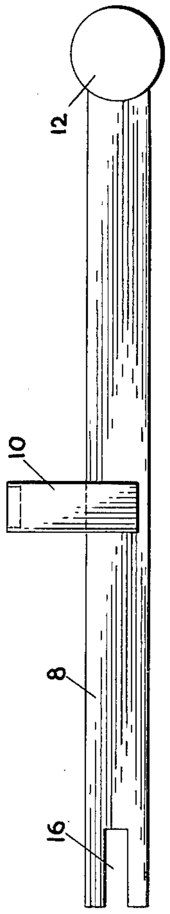
FIGURE 8 is a side view of the hook actuating lever with its fulcrum.
Figure 7:
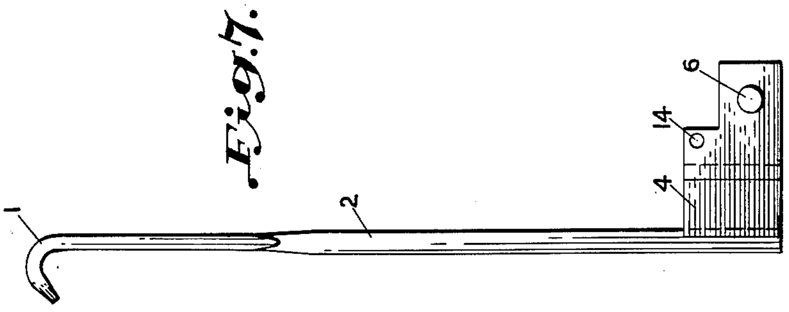
FIGURE 7 is a side view of the hook, hook extension and hook sliding key.
Figure 12:
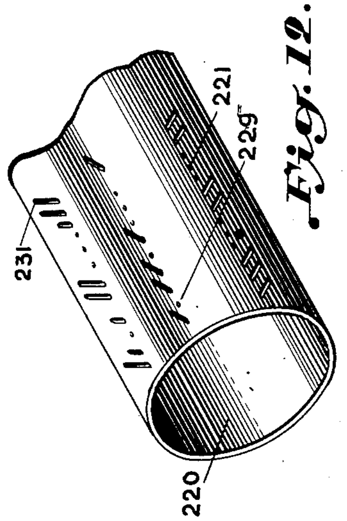
FIGURE 12 is an isometric drawing of a pattern drum showing individual pins in lieu of pattern keys.

Referring to FIGURE 6, there is shown a portion of the pattern assembly namely, the hook mounting assembly 21*a*, which has positioned above it the perforated pattern drum 220 illustrated in FIGURE 12.

The hook mounting assembly 21*a* comprises a support block 112 having a transverse hole 112*a* adapted to fit on rear hook shaft 142. The flat top face of the block 112 carries a plate bracket 22 having a transversely extending, upright hook guide bar 21 secured across one end and a spacer and anchor bar 92 positioned across the other end parallel to the hook guide bar 21. The hook guide bar 21 has a plurality of vertically extending parallel hook guides 23 in which the hooks 1 slide up and down in accordance with the pattern set up on the pattern drum 220. The hook guide bar 21 also has a groove which mounts a guard plate 90 which serves to prevent the hooks from engaging any such yarn which may be below the level of those yarns which extend from backing yarn guide 60. The spacer and anchor bar 92 has a plurality of slots 24 in alignment with the hook guides 23. A groove 25, having a semi-cylindrically shaped bottom, extends across the anchor bar directly behind and in communication with slots 24.

As best shown in FIGURES 6–9, the hook assembly comprises a hook 1 having a downwardly extending flattened portion 2 which is the portion riding in guides 23. The hook portion 2 is secured to sliding key 4 having a bifurcated portion 26 with a pin 6 extending transversely thereacross. Hook actuating lever 8 has a transversely slotted end 16 which fits into the bifurcated portion 26 over pin 6. The opposite end of lever 8 terminates in a fulcrum member 12 having a curvature similar to that of groove 25 in which it rests. Intermediate the ends of the lever there is an upright contact button 10 which is the element contacted by the pins on the pattern drum 220 to control the movement of the hooks.

Referring to FIGURE 6, the hook assembly is operatively assembled in the hook mounting assembly by positioning the hook portion 2 in the hook guide 23 and placing the lever 8 in slot 24 in alignment with the guide 23 so that the fulcrum member 12 will smoothly pivot in groove 25. When all of the hook assemblies are in position a retaining bar 27 of appropriate cross-section is positioned in a passage formed of aligned dovetailed slots 28 in the inward vertical face of the guide bar 21. A spring holding bar 20 is secured to retaining bar 27 and is of the same length as the bar. A hook return spring 18 is secured to each hook assembly by means of pin 14 in the bifurcated portion 26 of the sliding key 4 while the other end of each spring 18 is fastened to the spring retaining bar 27. The fulcrum members 12 of the hook assemblies are held in position by cap plate 100 secured to the upper face of anchor bar 92 by screws 110 so as to cover groove 25.

The pattern drum 220 is rotatably mounted on shaft 184 directly over the contact buttons 10 on levers 8. As illustrated in FIGURE 12 pattern drum 220 comprises a cylinder having a plurality of longitudinally extending rows of perforations 229 evenly spaced around its circumference, one row for each course. There is one perforation in each row for each hook assembly although a pin 231 need not be placed in each hole in every row. The number of rows of perforations in a drum obviously determines the repeat of the pattern. In other words, the entire pattern is produced by one revolution of the pattern drum.

The function of the pattern drum 220 is to control the downward pull of hooks 1 and thereby determine the height of the pile in the fabric being produced. This may be accomplished by placing pins 231 of varying heights in drum perforations 229 so that they will engage contact buttons 10 to pull the pile yarn down in accordance with the pile heights desired.

The amount or height of pile formed is controlled by two means, first the cam 182 which, as previously set forth, effects the oscillation of hook mounting assembly 21*a* about front hook shaft 140 to produce a downward pull for a uniform distance for all hooks and, second, the pattern drum 220 with its pins 231 of varying heights which engage the contact buttons 10 to furnish additional pull for varying distances.

Figure 11:
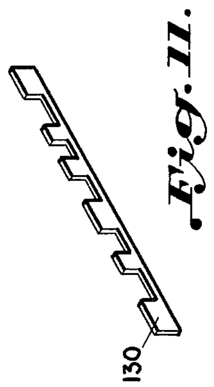
FIGURE 11 is a side view of an individual pattern key which is inserted in a pattern drum like in FIGURE 10.
Figure 10:
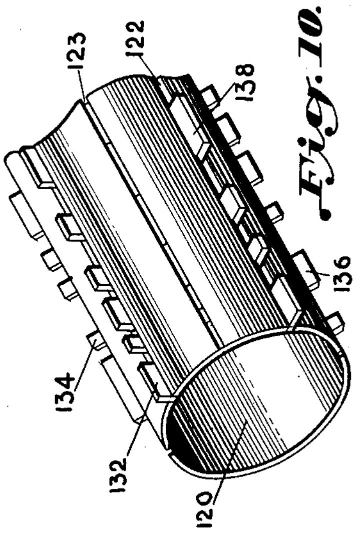
FIGURE 10 is an isometric drawing of the pattern drum with some pattern keys shown therein.

Means other than the pins used in drum 220 may be used to actuate the hook levers. For example, FIGURES 10 and 11 illustrate a pattern drum 120 having a plurality of longitudinally extending parallel slots 122 evenly spaced around its circumference. Pattern key members 130, 132, 134, 136 and 138 are inserted in slots 122 and their raised portions engage contact buttons 10 in order to actuate the hooks 1. In many respects this arrangement is more convenient than the use of pins.

Figure 5:
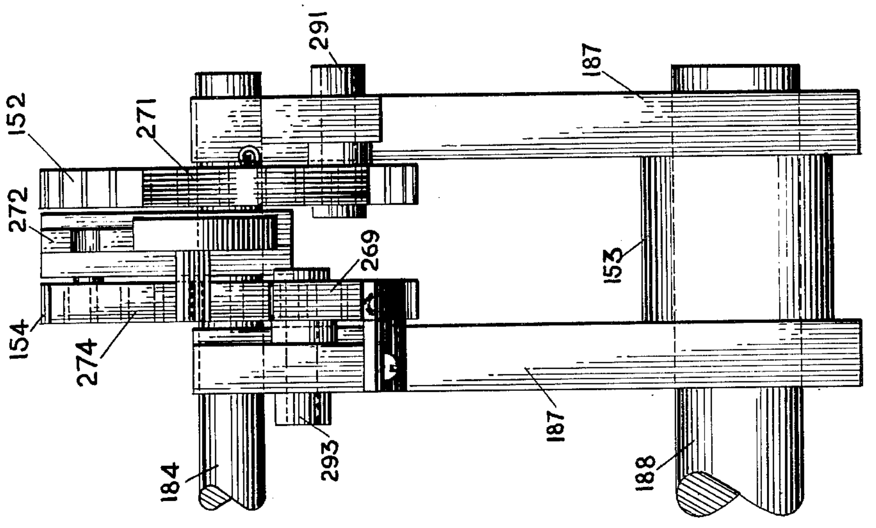
FIGURE 5 is a top view of the same parts shown in FIGURE 4.
Figure 4:
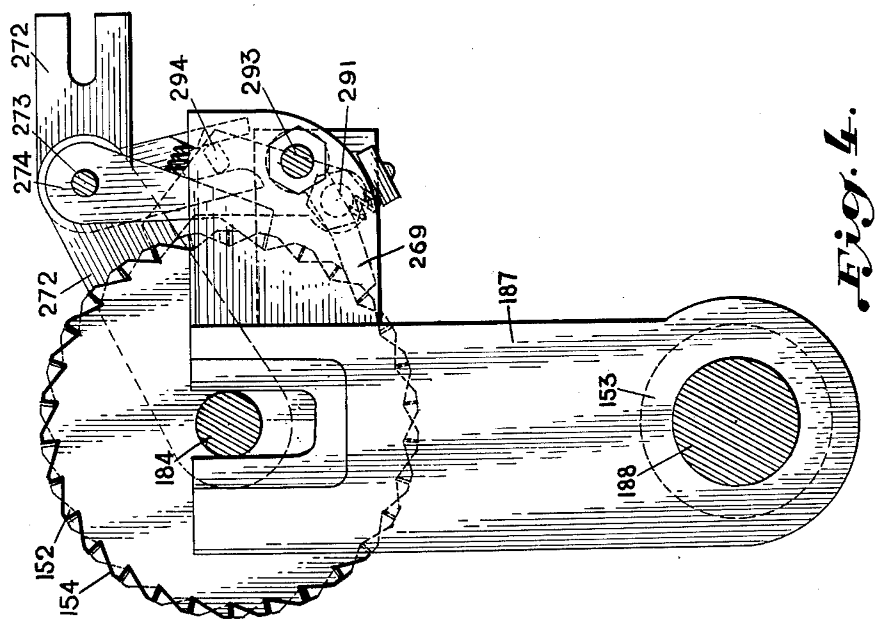
FIGURE 4 is a side view of the ratchet part of the pattern mechanism.

The pattern drum 220 is rotated by a ratchet assembly shown in FIGURES 4 and 5. This ratchet assembly serves to move the drum 220 stepwise one row per course. Obviously, the repeat of the pattern is governed by the number of rows of pins or similar elements extending around the drum circumference.

Referring to FIGURES 1, 2, 4, and 5, the ratchet assembly operates as follows. Ratchet cam 270 mounted on shaft 174 is engaged by cam follower 268 carried on cam lever 262 pivotally mounted at point 258. Cam lever 262 is pivotally secured to rod end 264 of rod 266 while the other end is connected to ratchet pawl lever 272 which is pivoted on shaft 184. Pawl 274 is pivotally mounted on lever 272 at point 273 so that its other end may engage the ratchet 154. Ratchets 152 and 154 are secured to shaft 184 on either side of lever 272. Support levers 187—187 are mounted on shaft 188 and are held in spaced relation thereon by collar 153. The other ends of support levers 187 fit on shaft 184. Brackets extend upwardly from each lever 187 adjacent the ratchets 152 and 154 and mount pins 291 and 293 for pivotally supporting holding pawls 271 and 269, respectively. Holding pawls 269 and 271 are spring biased into contact with ratchets 154 and 152. As cam 270 rotates, pawl 274 steps ratchet 154 forward notch by notch. Holding pawl 269 acts to prevent rearward movement of ratchet 154 and holding pawl 271 acts to prevent forward movement of ratchet 152 thus making certain that there is no movement of drum 220 except by the action of pawl 274 on ratchet 154.

FIGURES 13–19 show step by step the method by which a pile fabric may be manufactured with high and low loops in the finished product.

Figure 13:
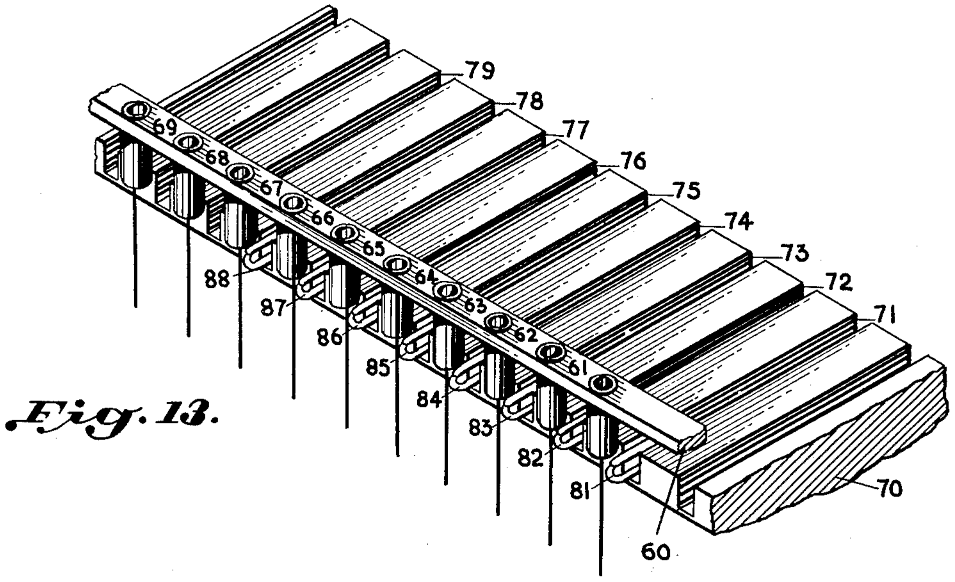
FIGURE 13 is an isometric drawing showing part of the needle bed and part of the backing yarn guide bar.
Figure 14:
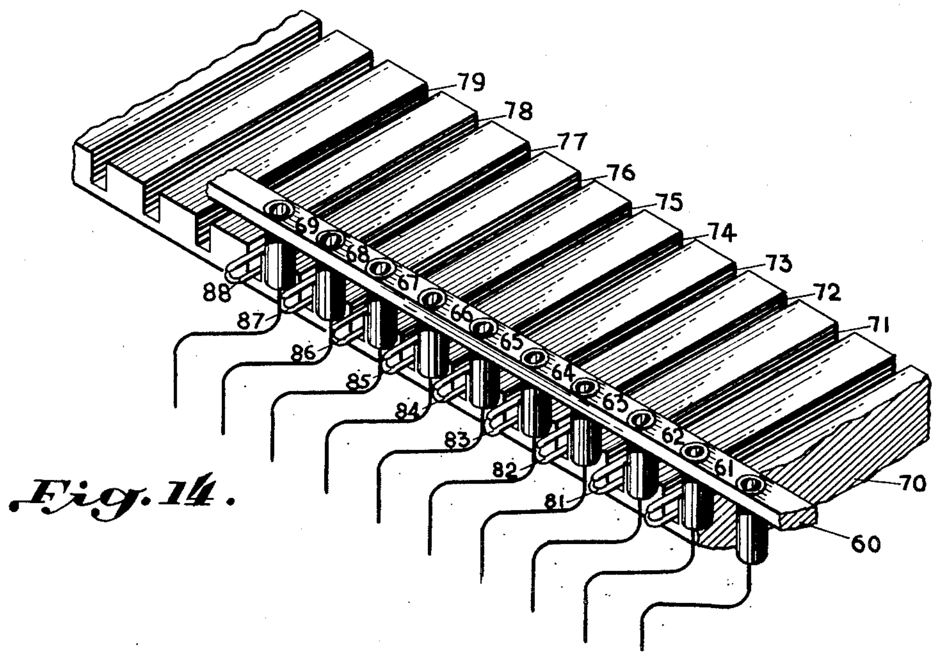
FIGURE 14 is an isometric drawing of a partial needle bed section, backing yarn guide bar, showing needles and part of the backing wefts.

FIGURE 13 shows needle bed 70 with needle guides 71—79 and latch needles 81—88. Only the backing weft guide bar 60 is shown, for simplification of understanding, in its neutral position with backing yarn guide tubes 61—69. In this figure needle guide 71 is aligned with backing yarn guide tube 61 and needle 81. Likewise, needle guide 72 is aligned with backing yarn guide tube 62 and needle 82 and the remaining needle guides, backing yarn guide tubes and needles are similarly aligned. In FIGURE 14 the one sidewise movement of backing yarn guide bar 60 is shown whereby the backing yarn guide tubes move across three needle guide slots. Needle guide 71 with its needle 81 now has backing yarn guide tube 63 on the right side of needle 81 and on the left side of needle 81 it has backing yarn guide tube 64. This is the motion in one course and in the following course backing yarn guide bar 60 moves leftwise to return to the same position as was shown in FIGURE 13.

Figures 15, 16:
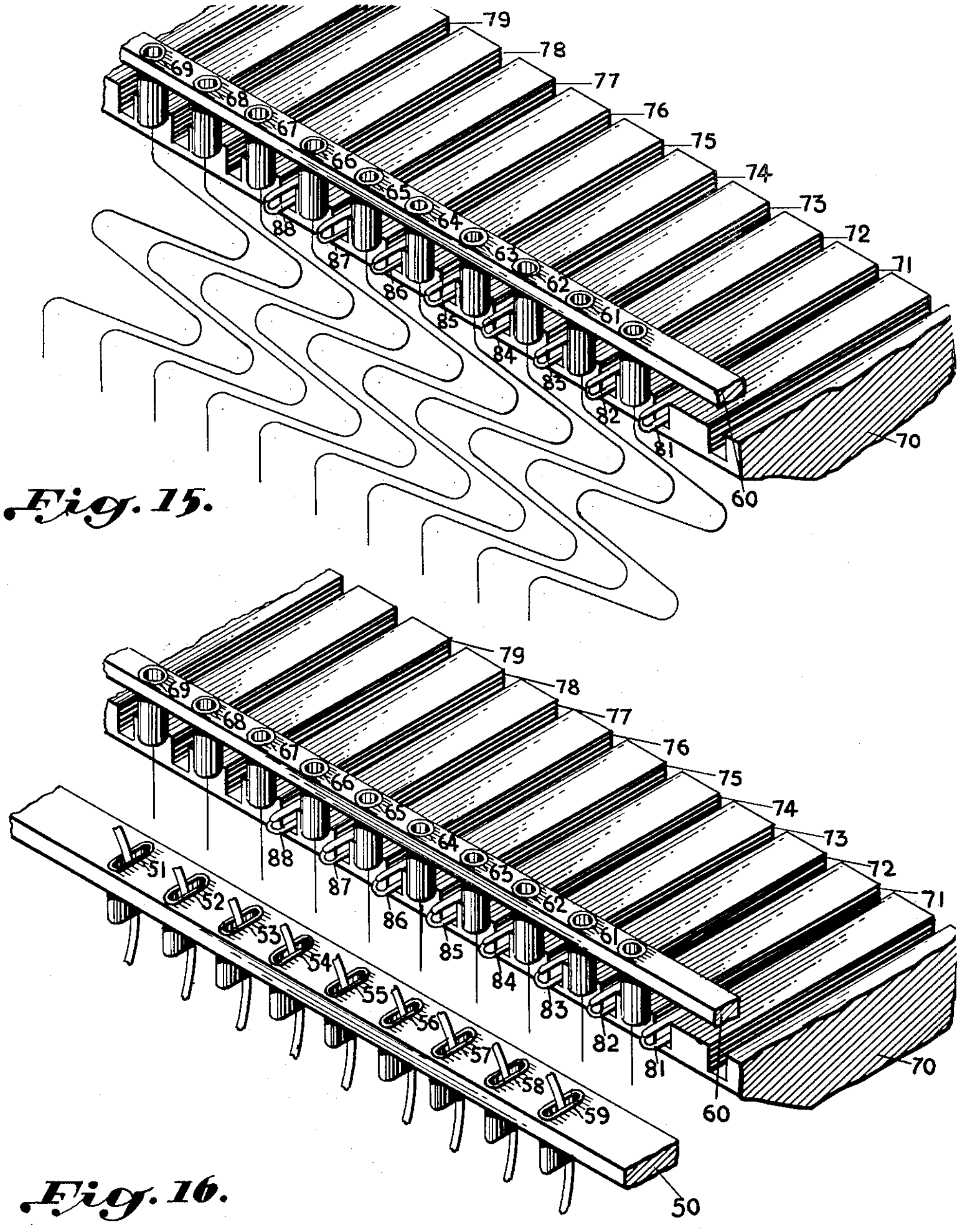
FIGURE 15 is an isometric drawing like FIGURE 14 indicating the directional movement of the backing wefts in different courses.
FIGURE 16 is an isometric drawing showing part of the needle bed, the backing yarn guide bar and the pile yarn guide bar.

FIGURE 15 shows backing weft guide bar 60 again aligned with the needle guides according to FIGURE 13 but, in addition, a number of courses are shown in order to indicate the actual weft yarn position after a number of courses. For simplification of understanding the warp yarn stitches have not been included in this drawing.

Figure 17:
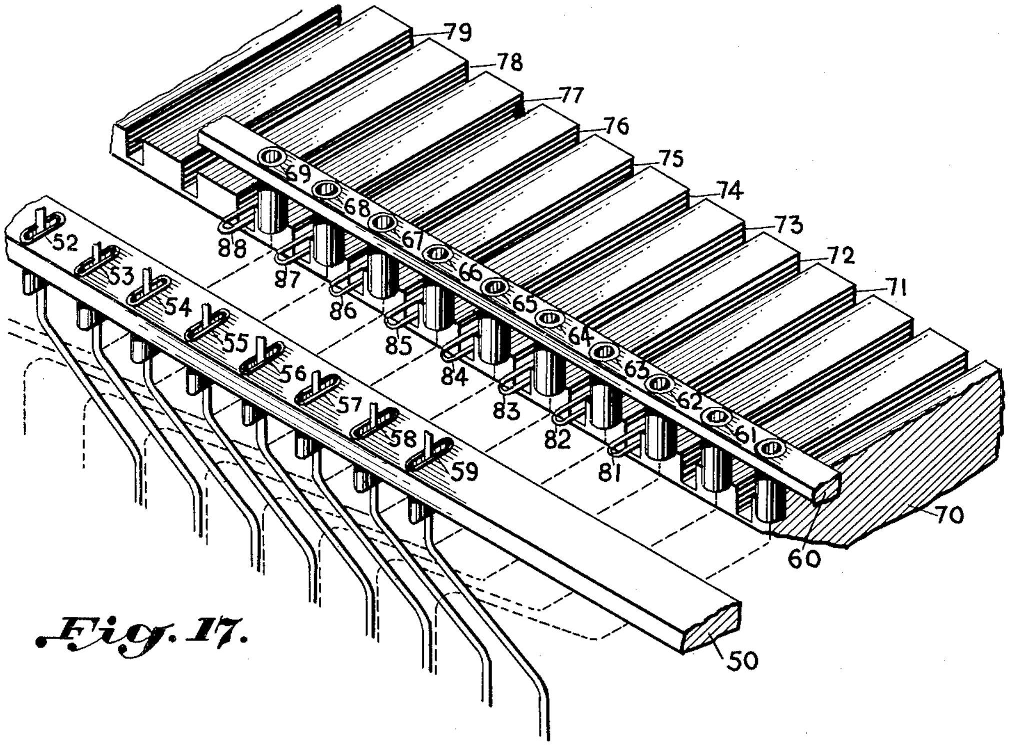
FIGURE 17 is another isometric drawing similar to FIGURE 16 illustrating the different direction of the backing wefts and the pile yarn.

FIGURE 16 is a figure similar to FIGURE 13 but in addition it shows the pile yarn guide bar 50. FIGURE 17 shows a drawing similar to the one in FIGURE 15 in addition to which there is shown pile yarn guide bar 50 with pile yarn guide tubes 51—59. As may be seen from this drawing the pile yarn moves, preferably, only across two adjacent areas of needles while the backing weft yarn moves across three needle spaces, as previously described.

Figure 18:
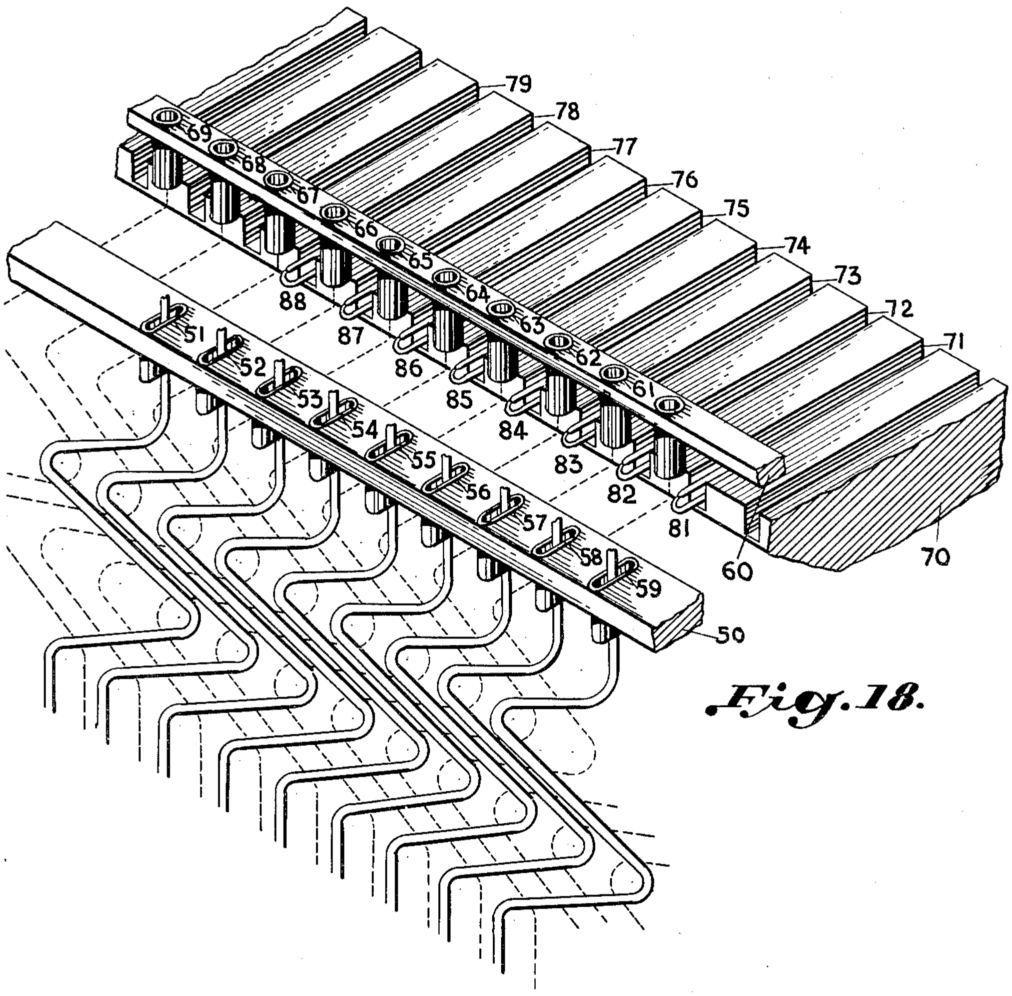
FIGURE 18 is similar to FIGURES 16 and 17 showing the back and forth movement of the backing wefts and the pile yarn, respectively, in different courses.

FIGURE 18 is similar to FIGURE 17 indicating a number of courses of backing yarn and pile yarn without the employment of the hooks and the pattern attachment of this invention.

Figure 19:
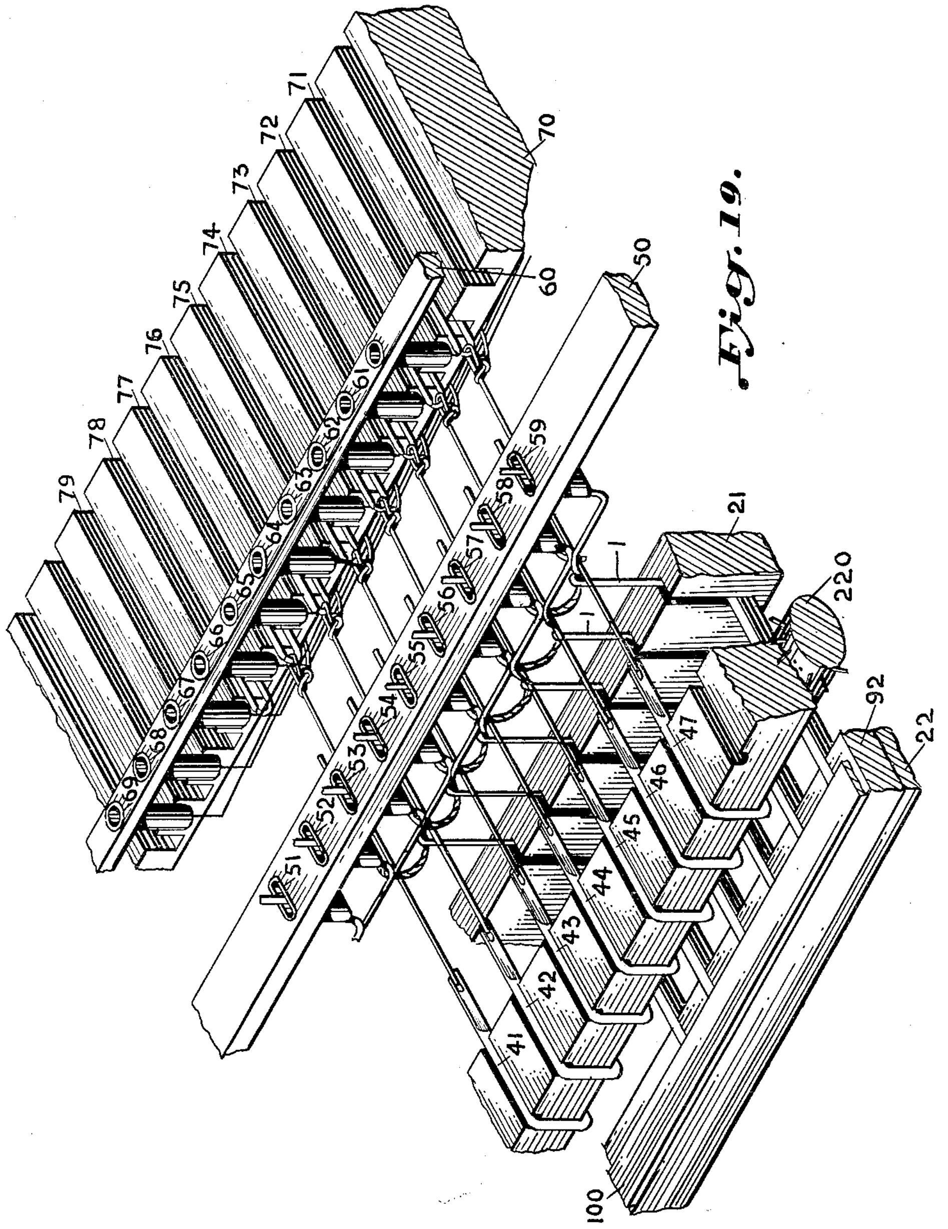
FIGURE 19 is another isometric drawing showing parts of the needle bed, the backing yarn guide bar, the pile yarn guide bar, the hook guide section and the hooks and indicating how they operate together to form a pile fabric.

FIGURE 19 is another drawing to simplify the understanding of a fabric made by the method and the mechanism of this invention. Here there is shown a pattern drum 220 activating numerous hooks 1 which have grabbed some of the pile yarn from tubes 51—59. Some of the pile loops on the left side of warp yarn coming from warp yarn guides 42, 43, 44 and 47 are merely pulling loops to such a height as the original pile yarn cam 182 describes. Hooks 1 associated with warp yarn guides 45 and 46 on the left side of warp yarn guide 47 pull the pile yarn lower due to the fact that the pattern drum 220 in those spaces activates contact buttons 10 through pattern pins 231.

It is believed that the way in which a knitted pile fabric having pile of varying heights is produced by applying the device of this invention to a flat bed knitting machine is apparent in view of the preceding description. The fabric made by the apparatus previously described comprises a weft backing portion formed by yarn fed through guides 61—69 on guide bar 60, and a pile face portion formed by yarn fed through guides 51—59 on guide bar 50 as illustrated in FIGURE 18. The backing yarn and pile yarn are bound in position to form the fabric by chain warp from yarn fed through guides 41—47 on guide bar 40 as illustrated in FIGURE 19. The motions imparted to each member of the apparatus, particularly the backing yarn guide bar 60, the pile yarn guide bar 50, the needles 81—89, the warp yarn guide bar 40 and the hooks 1 have been previously described with particularity. Obviously, the number of weft backing yarns locked by the chain warps in a given course would depend on relative transverse movement of the guide bar 60 with respect to the needles 81—89.

I claim:

1. In a knitting machine, a pile forming mechanism for making relief type designs, said mechanism comprising a hook bar, a plurality of hooks mounted on said hook bar, an actuating lever connected to each hook, a pattern drum rotatably positioned adjacent the actuating levers, and pattern means on said drum engaging specific actuating levers to vary the movement of the hooks connected thereto.

2. A pile forming mechanism for making pile loops of different heights, said mechanism comprising a plurality of hook units, an actuating lever connected to each hook unit, and pattern means for individually effecting actuation of specific actuating levers to move corresponding hook units different amounts to produce pile loops of different heights.

3. A pile forming mechanism for making pile loops of different heights adapted for use on a knitting machine having pile yarn feeding means and pile yarn fed therethrough, said mechanism comprising a hook bar, said bar having a plurality of parallel guides therein, a plurality of hooks carried in the guides, said hooks being adapted to engage the pile yarn, an actuating lever connected to each hook, and pattern means engaging specific actuating levers to move corresponding hooks different distances to produce pile loops of different heights.

4. The invention described in claim 3 wherein the pattern means comprises a pattern drum positioned adjacent the actuating levers and pattern elements on the drum engaging the actuating levers.

5. The invention described in claim 4 wherein the pattern elements comprise pin elements engaging the actuating levers.

6. A pile forming mechanism for making pile loops of different heights adapted for use on a knitting machine having pile yarn feeding means and pile yarn fed therethrough, said mechanism comprising a base, a hook bar positioned on the base, said hook bar having a plurality of parallel guides therein, an anchor bar positioned on the base spaced from and parallel to the hook bar, said anchor bar having a plurality of slots in alignment with the hook bar guides, a plurality of hooks carried in the hook bar guides, said hooks being adapted to engage the pile yarn, an actuating lever connected to each hook, a portion of each actuating lever resting in a slot in the anchor bar which is in alignment with the guide carrying the hook to which each lever is connected, and pattern means for selectively engaging the actuating levers to pivot same about the anchor to move the corresponding hooks different distances thereby producing pile loops of different heights.

References Cited in the file of this patent

UNITED STATES PATENTS

| | | |
|---|---|---|
| 2,531,718 | Rice | Nov. 28, 1950 |
| 2,609,004 | St. Jean et al. | Sept. 2, 1952 |
| 2,718,132 | Herrnstadt | Sept. 20, 1955 |

FOREIGN PATENTS

| | | |
|---|---|---|
| 273,409 | Great Britain | July 6, 1927 |
| 484,789 | Italy | Sept. 18, 1953 |